United States Patent
Balder et al.

(10) Patent No.: US 12,427,980 B2
(45) Date of Patent: Sep. 30, 2025

(54) VEHICLE CONTROL METHOD FOR A STOP ON THE MOVE STATE

(71) Applicant: JAGUAR LAND ROVER LIMITED, Warwickshire (GB)

(72) Inventors: Scott Balder, Coventry (GB); Thomas Mourre, Coventry (GB); Christopher Green, Coventry (GB); Paul Marsden, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 424 days.

(21) Appl. No.: 17/296,112

(22) PCT Filed: Nov. 19, 2019

(86) PCT No.: PCT/EP2019/081841
§ 371 (c)(1),
(2) Date: May 21, 2021

(87) PCT Pub. No.: WO2020/104476
PCT Pub. Date: May 28, 2020

(65) Prior Publication Data
US 2022/0017087 A1    Jan. 20, 2022

(30) Foreign Application Priority Data
Nov. 21, 2018   (GB) ...................... 1818918

(51) Int. Cl.
*B60W 10/06*        (2006.01)
*B60W 10/18*        (2012.01)
(Continued)

(52) U.S. Cl.
CPC ............ *B60W 30/14* (2013.01); *B60W 10/06* (2013.01); *B60W 10/18* (2013.01);
(Continued)

(58) Field of Classification Search
CPC .. B60W 30/00; B60W 10/00; B60W 2540/00; B60W 2710/00; B60W 2720/00; F02N 11/00; F02N 2200/00
See application file for complete search history.

(56) References Cited

U.S. PATENT DOCUMENTS 9,969,397 B2 *   5/2018   Yokokawa ............ B60W 10/06
10,576,983 B2 *  3/2020   Takase .................. B60W 10/06
(Continued)

FOREIGN PATENT DOCUMENTS

CN    103703243 A    4/2014
CN    107401460 A    11/2017
(Continued)

OTHER PUBLICATIONS

CN Application No. 201980089002-3, First review of the opinion notice dated Feb. 28, 2022.
(Continued)

*Primary Examiner* — Aniss Chad
*Assistant Examiner* — Elizabeth J Slowik
(74) *Attorney, Agent, or Firm* — Carlson, Gaskey & Olds, P.C.

(57) ABSTRACT

The present invention relates to a method of controlling a vehicle. The method comprises stopping (12) an engine (2) of the vehicle (1) when a speed of the vehicle (1) is greater than or equal to a speed threshold, and inhibiting (17) starting of the engine (2) if the speed of the vehicle (1) falls below the speed threshold and a driver demand for braking force is less than or equal to a braking force threshold. Further aspects of the invention relate to a control system, a system and a vehicle.

12 Claims, 4 Drawing Sheets

(51) Int. Cl.
  *B60W 30/14* (2006.01)
  *F02N 11/08* (2006.01)

(52) U.S. Cl.
  CPC ..... *F02N 11/0822* (2013.01); *B60W 2540/10* (2013.01); *B60W 2540/12* (2013.01); *B60W 2710/06* (2013.01); *B60W 2710/18* (2013.01); *B60W 2720/10* (2013.01); *B60W 2720/12* (2013.01); *F02N 2200/0801* (2013.01); *F02N 2200/10* (2013.01)

(56) References Cited

U.S. PATENT DOCUMENTS

| | | | |
|---|---|---|---|
| 10,619,614 B2* | 4/2020 | Mori | F02D 29/00 |
| 2012/0080001 A1 | 4/2012 | Saito et al. | |
| 2013/0006503 A1* | 1/2013 | Reiche | F02P 5/1506 |
| | | | 123/406.53 |
| 2013/0296123 A1* | 11/2013 | Doering | B60W 20/40 |
| | | | 477/174 |
| 2015/0260143 A1 | 9/2015 | Yorke et al. | |
| 2016/0297415 A1* | 10/2016 | Kato | F02D 41/065 |
| 2017/0043767 A1* | 2/2017 | Khafagy | B60W 30/16 |
| 2017/0321767 A1* | 11/2017 | Khafagy | F16D 48/06 |
| 2018/0015926 A1* | 1/2018 | Cunningham | B60W 10/06 |
| 2018/0156178 A1* | 6/2018 | Pedlar | F02N 11/0833 |
| 2018/0236995 A1* | 8/2018 | Iwamoto | B60W 10/02 |
| 2018/0274509 A1* | 9/2018 | Pedlar | F02N 11/0822 |
| 2019/0193717 A1* | 6/2019 | Komuro | B60W 50/0205 |
| 2019/0337516 A1* | 11/2019 | Kumazawa | B60W 30/18072 |

FOREIGN PATENT DOCUMENTS

| | | |
|---|---|---|
| CN | 108150298 A | 6/2018 |
| DE | 10 2011 080 172 A1 | 2/2013 |
| DE | 102015209972 A1 | 12/2016 |
| EP | 1028022 A2 | 8/2000 |
| EP | 3333409 A1 | 6/2018 |
| GB | 2557271 A | 6/2018 |
| JP | 2003-35175 | 2/2003 |
| JP | 2011202645 A | 10/2011 |
| WO | 2008/122368 A1 | 10/2008 |

OTHER PUBLICATIONS

Combined Search and Examination Report under Sections 17 and 18(3) for Application No. GB1818913.3 dated May 14, 2019.
International Search Report and Written Opinion of the International Searching Authority for International Application No. PCT/EP2019/081841 dated Feb. 13, 2020.
Su, et al., Dynamic coordinated control during mode transition process for a compound power-split hybrid electric vehicle, Mechanical Systems and Signal Processing, Elsevier, Amsterdam, NL, vol. 107, Feb. 2, 2018, pp. 221-240, XP085351167, ISSN: 0888-3270, DOI: 10.1016/J.YMSEEP.2018.01.023.

* cited by examiner

VEHICLE CONTROL METHOD FOR A STOP ON THE MOVE STATE

TECHNICAL FIELD

This invention relates to a method of controlling a vehicle, in particular to a method of controlling an engine and a braking system of a vehicle.

BACKGROUND

In some vehicles having an internal combustion engine, opportunities for stopping the engine during a journey may be identified in order to improve fuel economy. For example, it is known to stop an engine of a vehicle after it has decelerated to rest, such as when reaching a traffic signal, and restart the engine once a driver of the vehicle has released a brake pedal of the vehicle, in anticipation of a demand for positive torque. This may be referred to as 'stop-start' technology. In such vehicles having an automatic transmission, the engine may only be stopped if a braking force applied to the wheels of the vehicle exceeds a threshold. This threshold is predetermined during calibration of the vehicle from the braking force required to hold the vehicle at rest in the absence of any torque provided to the wheels from the engine. If a braking force is applied which is below this threshold, then the engine is not stopped after the vehicle has decelerated to rest so as to allow the 'creep' torque provided by the transmission to hold the vehicle at rest.

An extension to stop-start technology is also known in which an engine of a vehicle is disconnected from the wheels of the vehicle and stopped when there is no demand for the engine to provide positive torque, for example because a driver of the vehicle is not depressing an accelerator pedal, whilst the vehicle is in motion. Such technology may be referred to as 'stop on the move', 'coasting' or 'gliding'.

It will be appreciated that the terms 'stop on the move', 'coasting' and 'gliding' may refer to different control strategies in which an engine of a vehicle is stopped during motion of the vehicle than those described above. For the avoidance of doubt, 'stop on the move' will be used in this application to refer to any control strategy in which an engine of a vehicle is stopped during motion of the vehicle.

A problem has been identified in vehicles comprising both stop-start and stop on the move technology. In an example scenario, stop on the move conditions are satisfied and the engine of the vehicle will be stopped and disconnected from the transmission. Following this, the braking force applied to the wheels of the vehicle may not exceed the threshold required for the engine to be stopped under the stop-start system before the vehicle comes to rest. The braking force requirement for stop-start will therefore not be satisfied and as such the engine will restart once the vehicle comes to rest. Alternatively, the driver may apply a braking force whilst the vehicle is in motion that does satisfy the braking force requirement for stop-start. The driver may then reduce the braking force once the vehicle has come to rest, or just before the vehicle has come to rest in order to avoid a jerking motion. This latter scenario may be referred to as a 'chauffer stop'. In either scenario, the engine of the vehicle will restart if the driver reduces the braking force below the required braking force for stop-start.

The restarting of the engine as described above may mean that an opportunity to stop the engine, in order to save fuel, may not be being fully exploited. In addition, the subsequent restarting of the engine after it has been stopped may be unexpected by a driver of the vehicle, resulting in a poor driving experience.

It is an aim of the present invention to address the problem described above.

SUMMARY OF INVENTION

According to an aspect of the invention there is provided a controller for a vehicle, comprising a speed input to receive a signal indicative of a speed of the vehicle, a brake demand input configured to receive a driver brake demand, and a processor configured to determine that the vehicle speed is below a speed threshold and brake demand is above a first braking force threshold and in, dependence on the determination, stop the engine and to maintain the engine in the stopped state in response to determining that the vehicle speed is below the speed threshold and brake demand is below a second braking force threshold.

The stopping of the engine when a speed of the vehicle is less than a speed threshold may be carried out by a stop on the move system of the vehicle. The speed threshold may be the lower threshold for the stop on the move system below which, in conventional vehicles, the engine is started. The braking force threshold may be a braking force threshold associated with a stop-start system of the vehicle, wherein the engine would not be stopped if the speed of the vehicle fell below the speed threshold and a driver demand for braking force did not exceed the braking force threshold.

In conventional vehicles comprising both stop on the move and stop-start technology, wherein an engine of the vehicle can be stopped when a speed of the vehicle is greater than a speed threshold as described in the preceding paragraph, the engine may be restarted if the speed of the vehicle falls below the speed threshold and a driver demand for braking force does not exceed a braking force threshold as described in the preceding paragraph, even if the engine is not required to start. As a result, the fuel consumption of the vehicle will be unnecessarily increased. The method of the invention advantageously inhibits restarting of the engine in such a scenario and only restarts the engine if required, as described below.

The processor may be further configured to determine that the speed of the vehicle received at the speed input is below a first speed threshold and the driver brake demand received at the brake demand input is above the first braking force threshold and in, dependence on the determination, transmit a signal to cause the engine to be stopped, the processor being further configured to transmit a signal to cause the engine to be maintained in the stopped state in response to determining that the speed of the vehicle is below a second speed threshold and driver brake demand is below a second braking force threshold. The first speed threshold being the upper speed threshold for a stop on the move system, below which the engine is stopped, and the second speed threshold being the lower speed threshold for a stop on the move system below which the engine is restarted.

The controller may further comprise an input to receive a positive torque demand and the processor, in, response to the controller receiving a positive torque demand causes the engine to be started. In this way, the controller may be configured to cause the engine to maintain its stopped state provided that the speed is below a speed threshold even if there is no brake demand being received by the controller. This allows the driver to remove their foot from the brake pedal without the engine starting.

The controller may cause the engine to be started in response to a determination of a decrease in driver brake demand and one or more further conditions being satisfied. The one or more further conditions include at least one of: a probability of the demand for positive torque increasing to above the positive torque threshold being greater than a probability threshold, and a transmission of the vehicle not being in neutral.

The first speed threshold may be greater than the second speed threshold. The first braking force threshold may be greater than the second braking force threshold.

When the engine is in a stopped state and the processor determines a decrease in brake demand from the driver, the processor may cause a braking force to be maintained independently of the brake demand for braking force. This facilitates the engine remaining in a stopped state when the vehicle for example, is not in motion.

The controller may, on determining that the engine has stopped and the speed of the vehicle is increasing, cause the braking force to be increased. This acts to prevent the vehicle from moving in the absence of a positive torque demand from the driver.

According to an aspect of the invention there is provided a method of controlling a vehicle. The method comprises stopping an engine of the vehicle when a speed of the vehicle is greater than or equal to a speed threshold, and inhibiting starting of the engine if the speed of the vehicle falls below the speed threshold and a driver demand for braking force is less than or equal to a braking force threshold.

The stopping of the engine when a speed of the vehicle is greater than or equal to the speed threshold may be carried out by a stop on the move system of the vehicle. The speed threshold may be a speed threshold associated with a stop-start system of the vehicle, wherein the engine is stopped if the speed of the vehicle falls below the speed threshold and the engine was running prior to the speed of the vehicle falling below the speed threshold. The braking force threshold may be a braking force threshold associated with a stop-start system of the vehicle, wherein the engine would not be stopped if the speed of the vehicle fell below the speed threshold and a driver demand for braking force did not exceed the braking force threshold.

In conventional vehicles comprising both stop on the move and stop-start technology, wherein an engine of the vehicle can be stopped when a speed of the vehicle is greater than a speed threshold as described in the preceding paragraph, the engine may be restarted if the speed of the vehicle falls below the speed threshold and a driver demand for braking force does not exceed a braking force threshold as described in the preceding paragraph, even if the engine is not required to start. As a result, the fuel consumption of the vehicle will be unnecessarily increased. The method of the invention advantageously inhibits restarting of the engine in such a scenario and only restarts the engine if required, as described below.

The method may further comprise increasing a braking force independently of the driver demand for braking force following inhibiting starting of the engine if the driver demand for braking force is equal to zero, a demand for positive torque is less than or equal to a positive torque threshold and the speed of the vehicle increases.

This provides the advantage of mitigating or preventing undesirable movement of the vehicle, such as rolling down a negative gradient, after the vehicle has come to rest without the need to restart the engine.

The method may further comprise allowing starting of the engine following inhibiting starting of the engine, and subsequently starting the engine, if the driver demand for braking force decreases. Optionally, one or more further conditions must be satisfied in order to allow starting of the engine in this scenario. The one or more further conditions being satisfied may comprise at least one of a probability of the demand for positive torque increasing to above the positive torque threshold being greater than a probability threshold, and a transmission of the vehicle not being in neutral.

The engine is started in this scenario because the decrease in the driver demand for braking force, for example as a result of a driver of the vehicle releasing a brake pedal of the vehicle, is an indication that a demand for positive torque, for example as a result of the driver depressing an accelerator pedal of the vehicle, is imminent. Any delay between a demand for positive torque and the engine delivering positive torque is therefore mitigated or removed. By employing the one or more further conditions the method can allow, for example, for a driver of the vehicle to release a brake pedal of the vehicle to intentionally allow the vehicle to roll down an incline without the need for restarting the engine.

The method may further comprise maintaining a braking force independently of the driver demand for braking force following inhibiting starting of the engine if the driver demand for braking force decreases from a value greater than zero.

Maintaining this braking force may assist in maintaining the vehicle at rest prior to a driver demand for positive torque.

The stopping of the engine of the vehicle when a speed of the vehicle is greater than or equal to the speed threshold may be carried out if the speed of the vehicle is less than a further speed threshold, and/or the demand for braking force is greater than a further braking force threshold.

The braking force threshold may be greater than the further braking force threshold.

The driver demand for braking force may comprise actuation of a brake pedal by a driver of the vehicle.

The demand for positive torque may comprise actuation of an accelerator pedal by a driver of the vehicle.

In embodiments of the invention which comprise increasing a braking force, increasing the braking force may comprise operating a braking system of the vehicle to increase the braking force.

In embodiments of the invention which comprise maintaining a braking force, maintaining the braking force may comprise operating a braking system of the vehicle to increase the braking force.

According to a further aspect of the invention, there is provided a control system comprising at least one electronic processor, and at least one electronic memory device including computer program instructions. The at least one electronic memory device and the computer program instructions are configured to, with the at least one electronic processor, cause the control system at least to perform the method described above.

According to a further aspect of the invention, there is provided a system comprising an engine, a braking system, a brake pedal, an accelerator pedal and a control system as described above.

According to a further aspect of the invention, there is provided a vehicle comprising a control system or a system as described above.

BRIEF DESCRIPTION OF DRAWINGS

The present invention will now be described, by way of example only, with reference to the accompanying drawings in which:—

DETAILED DESCRIPTION

Figure 1:
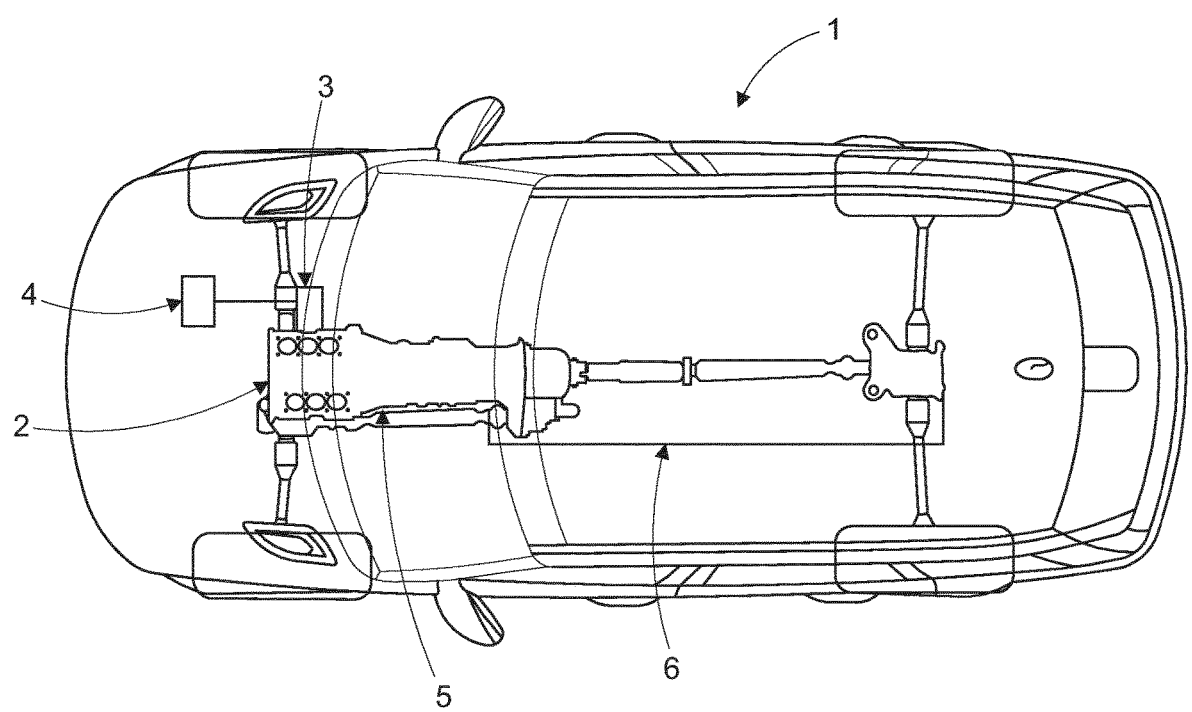
FIG. 1 illustrates a vehicle according to an embodiment of the present invention.

FIG. 1 is a schematic illustration of a vehicle 1 according to an embodiment of the present invention. The vehicle 1 has a conventional internal combustion engine 2 provided with a belt-integrated starter/generator (BISG) 3, a battery 4 for powering the BISG 3, and an automatic transmission 5. The automatic transmission is coupled to a driveline 6 that includes a power transfer unit (PTU) and rear drive shaft. The engine 2, BISG 3, battery 4, transmission 5 and driveline 6 are collectively referred to as a powertrain of the vehicle. Positive torque, for driving the vehicle 1, is requested from the powertrain by means of an accelerator pedal.

The vehicle 1 also has a braking system (not shown in FIG. 1). The braking system comprises brakes associated with wheels of the vehicle 1, a hydraulic circuit configured to provide braking force to the brakes, and a brake pedal to allow a driver of the vehicle 1 to produce a demand for braking force.

The vehicle 1 is provided with a controller (not shown in FIG. 1) for controlling the powertrain and the braking system. The controller is configured to receive signals indicative of the speed of the vehicle 1, a demand for positive torque produced by a driver of the vehicle 1 through means of the accelerator pedal, and a demand for braking force (brake demand) produced by the driver through means of the brake pedal. The controller is also configured to stop and start the engine 2 by means of the BISG 3, command the powertrain to deliver positive torque to drive the vehicle 1 in response to actuation of the accelerator pedal, and command the hydraulic circuit to provide a braking force to the brakes independently of the demand for braking force produced by the driver.

For purposes of this disclosure, it is to be understood that the controller(s) described herein can each comprise a control unit or computational device having one or more electronic processors. A vehicle and/or a system thereof may comprise a single control unit or electronic controller or alternatively different functions of the controller(s) may be embodied in, or hosted in, different control units or controllers. A set of instructions could be provided which, when executed, cause said controller(s) or control unit(s) to implement the control techniques described herein (including the described method(s)). The set of instructions may be embedded in one or more electronic processors, or alternatively, the set of instructions could be provided as software to be executed by one or more electronic processor(s). For example, a first controller may be implemented in software run on one or more electronic processors, and one or more other controllers may also be implemented in software run on or more electronic processors, optionally the same one or more processors as the first controller. It will be appreciated, however, that other arrangements are also useful, and therefore, the present disclosure is not intended to be limited to any particular arrangement. In any event, the set of instructions described above may be embedded in a computer-readable storage medium (e.g., a non-transitory computer-readable storage medium) that may comprise any mechanism for storing information in a form readable by a machine or electronic processors/computational device, including, without limitation: a magnetic storage medium (e.g., floppy diskette); optical storage medium (e.g., CD-ROM); magneto optical storage medium; read only memory (ROM); random access memory (RAM); erasable programmable memory (e.g., EPROM ad EEPROM); flash memory; or electrical or other types of medium for storing such information/instructions.

A braking force may be provided to the brakes independently of a demand produced by the driver by, for example, the electronic controller commanding a pump of the hydraulic circuit to increase the pressure in the hydraulic circuit, thereby increasing the braking force provided to the brakes.

Figure 2:
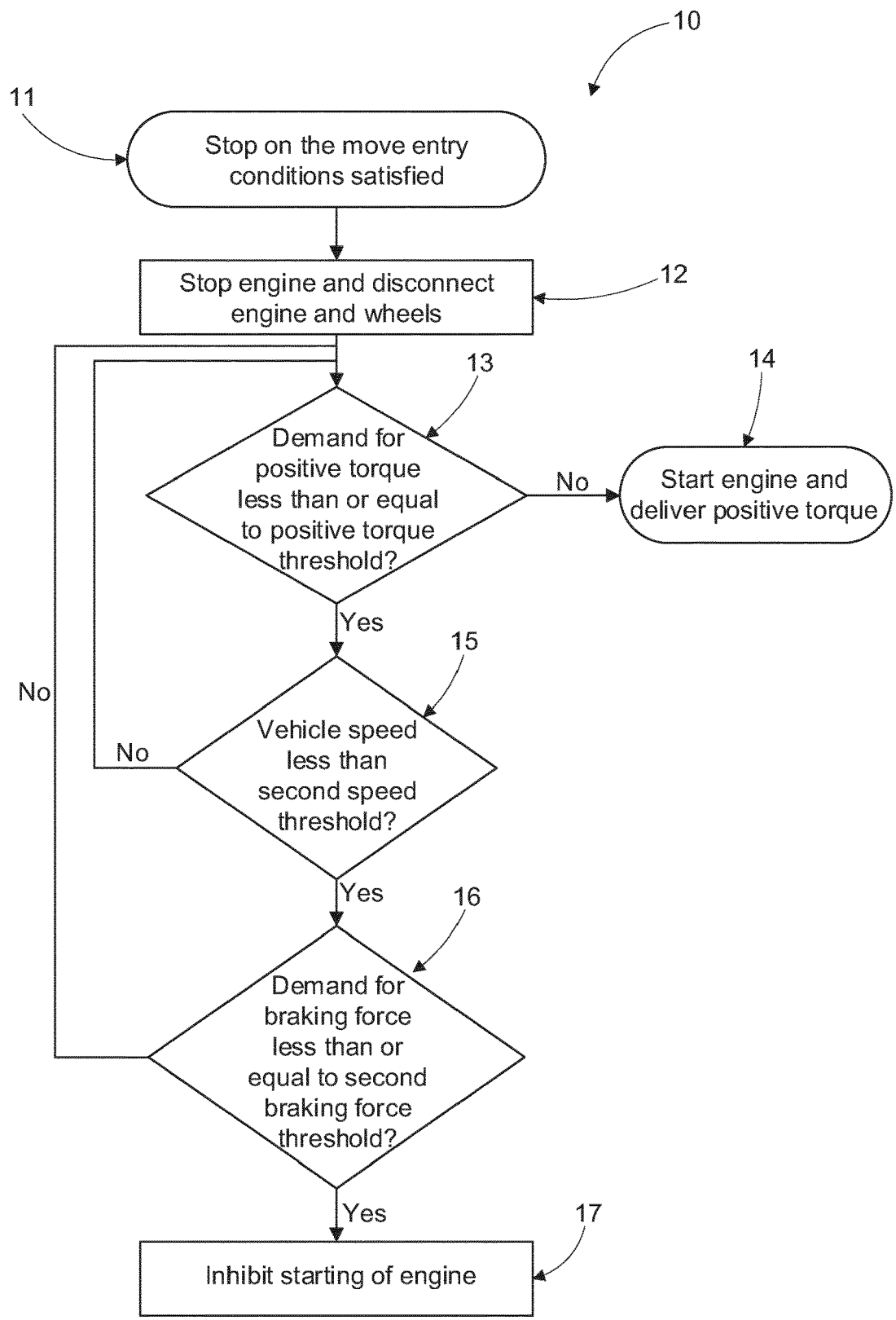
FIG. 2 illustrates schematically an aspect of a powertrain control strategy according to the present invention.

A method 10 according to an embodiment of the present invention, which may be employed by the controller as described above, will now be described with reference to FIG. 2, and with reference to the vehicle 1 described above.

The method 10 begins with determining 11 that conditions are satisfied that allow for the vehicle 1 to enter a stop on the move state. These conditions being met comprise a demand for positive torque being below a positive torque threshold, for example an amount of torque required to accelerate the vehicle from its current speed, and the engine 2 being in a running state. This may occur when a driver of the vehicle 1 releases the accelerator pedal while the vehicle is in motion and the engine 2 is running. The conditions being met may further comprise the speed of the vehicle 1 being below a first speed threshold, for example 20 kph, and a demand for braking force being above a first braking force threshold, for example 0.1 bar. When the conditions are met, the engine 2 is stopped and disconnected 12 from the wheels of the vehicle 1. In such a scenario, the vehicle 1 may be decelerating in response to a driver of the vehicle 1 recognising a requirement to reduce the speed of the vehicle 1, and subsequently demanding a braking force through means of the brake pedal.

While the engine 2 is stopped and disconnected from the wheels of the vehicle, the method continues to monitor 13 the demand for positive torque. If the demand for positive torque increases to above the positive torque threshold then the engine is restarted 14 such that it can deliver positive torque to the wheels.

The method also continues to monitor 15, 16 the speed of the vehicle 1 and the demand for braking force. If the speed of the vehicle 1 falls below a second speed threshold and the braking force demand is less than or equal to a second braking force threshold, starting of the engine 2 is inhibited 17. The speed of the vehicle 1 being below the second speed threshold and the braking force demand being greater than the second braking force threshold may be the conditions required for the engine 2 to be stopped as part of a stop-start control strategy. Therefore, in conventional vehicles comprising stop on the move and stop-start technology, the engine 2 would be restarted if the speed of the vehicle 1 fell below the second speed threshold and the braking force demand was less than or equal to the second braking force threshold because the conditions required for the engine to be stopped as part of the stop-start control strategy have not been satisfied. In contrast, the method 10 of the present invention actively inhibits 17 restarting the engine 2 under these conditions, providing the advantage of extending the fuel saving functionality of stop on the move as well as vehicle behaviour that is expected by the driver.

It will be appreciated that the second braking force threshold will vary according to the mass of the vehicle 1 and the gradient of the surface on which the vehicle 1 is located when at rest. The vehicle 1 may comprise sensors which are able to produce signals indicative of the mass of the vehicle 1 and the gradient of the surface on which the vehicle 1 is located. These signals may then be used as inputs to a controller of the vehicle 1 configured to calculate and output a value of the braking force required to hold the vehicle 1 at rest, i.e. the second braking force threshold.

It is to be understood that inhibiting starting of the engine 2 according to the present invention may comprise providing a signal which commands the engine 2 to remain stopped, or to not be started. Inhibiting starting of the engine 2 may also comprise the absence of a signal commanding the engine 2 to be started.

Figure 3A:
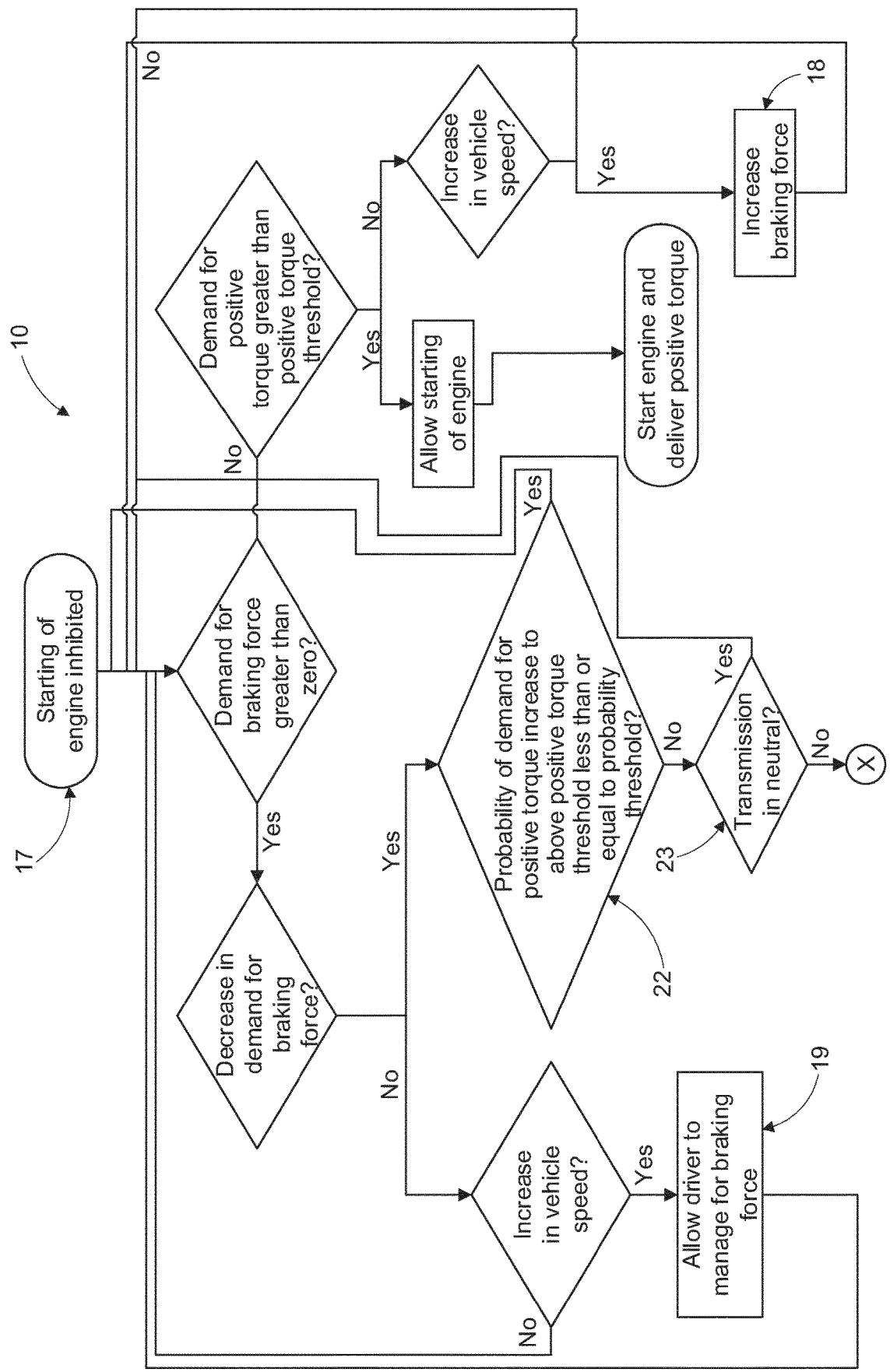
FIGS. 3A and 3B illustrate schematically further features of the powertrain control strategy illustrated in FIG. 2.
Figure 3B:
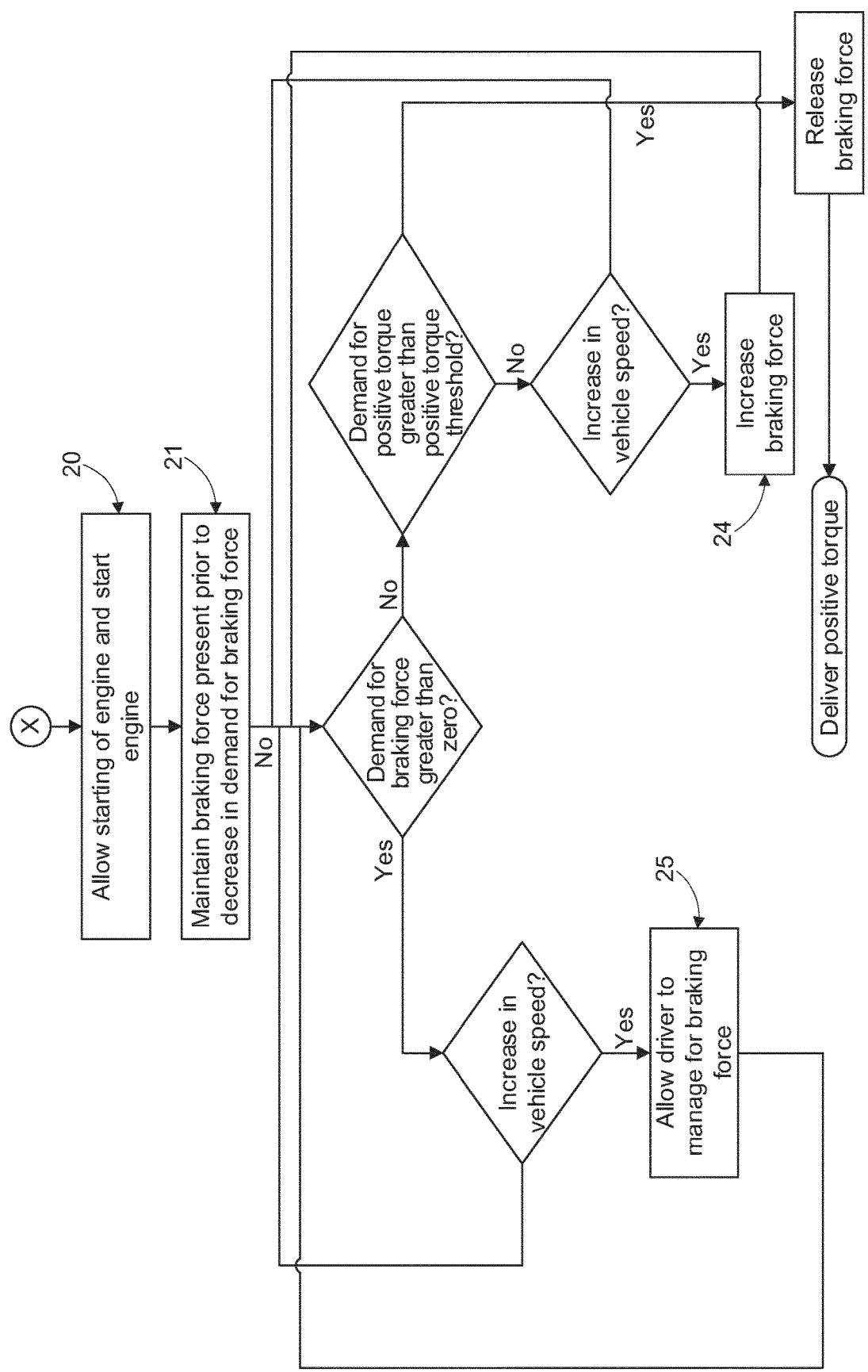

The next stages of the method 10 will now be described with reference to FIGS. 3A and 3B.

At this stage of the method 10, the vehicle 1 may have come to rest with the engine 2 stopped and the demand for braking force from the driver being less than or equal to the second braking force threshold. The method 10 will then continue to monitor the demand for positive torque, the demand for braking force and the vehicle speed. The vehicle speed may increase in the absence of a demand for positive torque as a result of, for example, the vehicle 1 rolling down a slope on which the vehicle 1 initially came to rest. The method 10 will react to such an increase in vehicle speed in dependence on a number of conditions as described below.

If the demand for braking force reached zero prior to starting of the engine 2 being inhibited 17, for example because a driver of the vehicle 1 had completely released the brake pedal, the method reacts to an increase in vehicle speed, following inhibiting 17 starting of the engine, by increasing 18 the braking force, for example by commanding a pump of the hydraulic circuit of the braking system of the vehicle 1 to increase the pressure in the hydraulic circuit.

If a demand for braking force is maintained following inhibiting 17 starting of the engine 2 and the speed of the vehicle 1 increases, the method allows 19 the driver of the vehicle 1 to increase the demand for braking force, for example by increasing depression of the brake pedal, in reaction to the increase in vehicle speed in order to bring the vehicle 1 back to rest without the need to start the engine 2.

This stage of the method 10 provides the advantages of further avoidance of starting the engine 2 if preferable, and therefore further reducing the fuel consumption of the vehicle 1, and not interfering with a driver demand for braking force if said demand is not sufficient to avoid an increase in vehicle speed. Increasing the braking force independently of a driver demand for braking force if a driver demand for braking force exists is undesirable because the driver would be able to detect such an increase in braking force via the brake pedal. This detection by the driver may be unexpected and as such result in a poor driving experience. This may be referred to as brake pedal corruption.

If a demand for braking force is present following inhibiting 17 starting of the engine 2 and the demand subsequently decreases, for example because a driver of the vehicle 1 has partially or completely released the brake pedal, then starting of the engine 2 will be allowed and the engine will be restarted 20. In addition, the braking system will act to maintain 21 the degree of braking force that was present at the point in time at which the decrease in demand for braking force was detected. The decrease in the demand for braking force is an indicator that a demand for positive torque is imminent. For example if the driver of the vehicle 1 releases the brake pedal when the vehicle 1 is at rest, it is likely that they intend to drive away from rest shortly thereafter. By starting the engine 2 ahead of a demand for positive torque, the delay between the driver demanding positive torque and the engine 2 delivering positive torque is reduced. Maintaining braking force following the decrease in the demand for braking force and ahead of a demand for positive torque acts to maintain the vehicle 1 at rest before the engine 2 is able to provide creep torque.

As described above, the method 10 reacts to the decrease in a demand for braking force by restarting the engine 2 in anticipation of a demand for positive torque. However, there may be scenarios in which the engine 2 is not required to be restarted following a decrease in demand for braking force. The method 10 therefore may include at least one mechanism 22, 23 to provide the decision of whether or not to restart the engine 2 following a decrease in demand for braking force. For example, information from inputs such as cameras mounted on the vehicle or a GPS based navigation system may be used to determine 22 that the probability that there will be a demand for positive torque, that exceeds the positive torque threshold, following a decrease in a demand for braking force is less than or equal to a probability threshold. This may be applicable where, for example, the vehicle 1 has been brought to rest with the front of the vehicle 1 facing down a lengthy incline representing a section of road on which no other vehicles or obstacles are present. When the driver releases the brake pedal, the vehicle 1 could be allowed to accelerate down the incline under the force of gravity alone with the engine 2 only being restarted when the demand for positive torque increases above the positive torque threshold.

Another such mechanism 23 may be to allow the vehicle speed to increase when the demand for braking force decreases, without starting the engine 2, when the transmission of the vehicle 1 is in neutral. For example a driver of the vehicle 1 may bring the vehicle 1 to rest, with the front of the vehicle 1 facing down an incline. The driver may then wish to move the vehicle 1 a short distance down the incline by releasing the brake pedal slightly and allowing the vehicle 1 to roll before reapplying brake pedal depression to bring the vehicle 1 back to rest. With the transmission in neutral, restarting of the engine 2 could be inhibited in such a scenario.

After the engine 2 is started and the braking force is maintained following a decrease in the demand for braking force, the method 10 will react to an increase in vehicle speed, for example as a result of the creep torque and maintained braking force not being sufficient to hold the vehicle 1 at rest, in dependence on the remaining demand for braking force. If the demand for braking force decreased to zero, then the braking system will act to increase 24 the braking force so as to decelerate the vehicle. If not, then the method allows 25 the driver of the vehicle 1 to increase the demand for braking force, for example by increasing depression of the brake pedal, in reaction to the increase in vehicle speed in order to bring the vehicle 1 back to rest without the need to start the engine 2.

An increase in vehicle speed following inhibiting starting of the engine 2 may not occur if the vehicle 1 is located on a level surface, and frictional forces between the wheels of the vehicle 1 and the surface and/or braking force provided by the braking system are sufficient to hold the vehicle 1 at rest. In this case, there is no need for the engine 2 to provide torque to prevent undesirable movement of the vehicle 1 from rest. The engine 2 can therefore remain stopped and as such not utilise any fuel.

If at any point following inhibiting 17 starting of the engine 2 a demand for positive torque greater than the positive torque threshold is detected, then the inhibiting 17 starting of the engine 2 will be cancelled, if it has not already been cancelled as a result of a decrease in the demand for braking force, and the engine 2 will be started such that it can deliver the demand for positive torque.

It will be understood that the embodiments described above are given by way of example only and are not intended to limit the invention, the scope of which is defined in the appended claims.

The invention claimed is:

1. A method comprising:
receiving a signal indicative of a vehicle speed;
receiving a driver brake demand;
with the vehicle in motion and an engine of the vehicle running, cause the vehicle to enter a stop on the move state by stopping the engine and disconnecting the engine from wheels of the vehicle responsive to determining that a demand for positive torque is below a positive torque threshold, the vehicle speed is below a first speed threshold, and the driver brake demand is above a first braking force threshold; and
maintaining the engine in a stopped state responsive to determining that the vehicle speed is below a second speed threshold and the driver brake demand is below a second braking force threshold, wherein the first braking force threshold is greater than the second braking force threshold.

2. A controller for a vehicle, comprising:
a speed input configured to receive a signal indicative of a speed of the vehicle;
a brake demand input configured to receive a driver brake demand; and
a processor configured to
with the vehicle in motion and an engine of the vehicle running, cause the vehicle to enter a stop on the move state by stopping the engine and disconnecting the engine from wheels of the vehicle responsive to determining that a demand for positive torque is below a positive torque threshold, the vehicle speed is below a first speed threshold, and the driver brake demand is above a first braking force threshold, and
maintain the engine in a stopped state responsive to determining that the vehicle speed is below a second speed threshold and the driver brake demand is below a second braking force threshold, wherein the first braking force threshold is greater than the second braking force threshold.

3. The controller according to claim 2, wherein the processor is configured to
transmit a signal to cause the engine to be stopped responsive to determining that the speed of the vehicle received at the speed input is below a first speed threshold and the driver brake demand received at the brake demand input is above the first braking force threshold, and
transmit a signal to cause the engine to be maintained in the stopped state responsive to determining that the speed of the vehicle is below a second speed threshold and the driver brake demand is below a second braking force threshold.

4. The controller according to claim 3, wherein the first speed threshold is greater than the second speed threshold.

5. The controller according to claim 2, comprising an input to receive a positive torque demand and wherein the processor, in response to receiving a positive torque demand, causes the engine to be started.

6. The controller according to claim 5, wherein the processor causes the engine to be started responsive to determining a decrease in driver brake demand and at least one further condition being satisfied.

7. The controller according to claim 6, wherein the at least one further condition includes at least one of a probability of the positive torque demand increasing above the positive torque threshold being greater than a probability threshold, and a transmission of the vehicle not being in neutral.

8. The controller according to claim 2, wherein, when the engine is in the stopped state and the processor determines a decrease in driver brake demand, the processor causes a braking force to be maintained independently of the driver brake demand.

9. The controller according to claim 2, wherein the controller, on determining that the engine has stopped and the speed of the vehicle is increasing, causes the braking force to be increased.

10. A system comprising:
the controller according to claim 2;
an engine;
a braking system;
a brake pedal; and
an accelerator pedal.

11. A vehicle comprising the controller according to claim 2.

12. A control system comprising:
a speed input to receive a signal indicative of a speed of a vehicle;
a brake demand input configured to receive a driver brake demand;
at least one processor; and
at least one electronic memory device including computer program instructions configured to cause the at least one processor to, with the vehicle in motion and an engine of the vehicle running, cause the vehicle to enter a stop on the move state by stopping the engine and disconnecting the engine from wheels of the vehicle responsive to determining that a demand for positive torque is below a positive torque threshold, the vehicle speed is below a speed threshold, and the driver brake demand is above a first braking force threshold and to maintain the engine in a stopped state responsive to determining that the vehicle speed is below a second speed threshold and the driver brake demand is below a second braking force threshold, wherein the first braking force threshold is greater than the second braking force threshold.

* * * * *